May 3, 1949. C. B. GOODSTEIN 2,468,821
BRAD
Filed Feb. 24, 1945
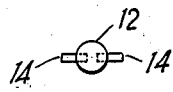 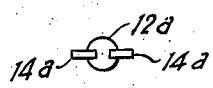 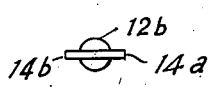 
Fig. 2  Fig. 4  Fig. 6  Fig. 12
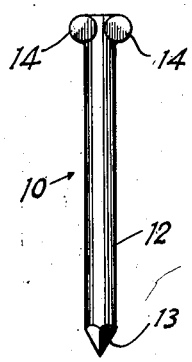 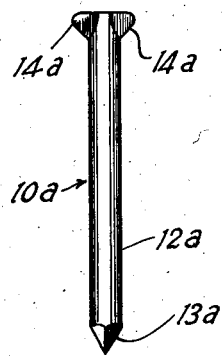 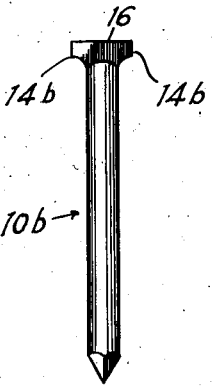 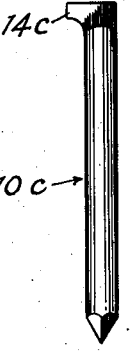
Fig. 1  Fig. 3  Fig. 5  Fig. 11
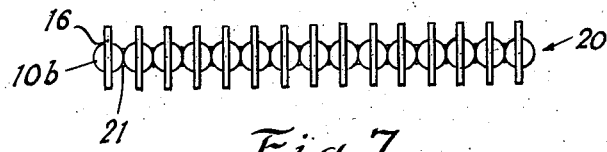
Fig. 7
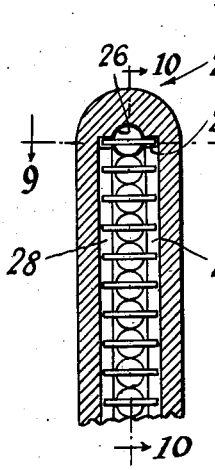 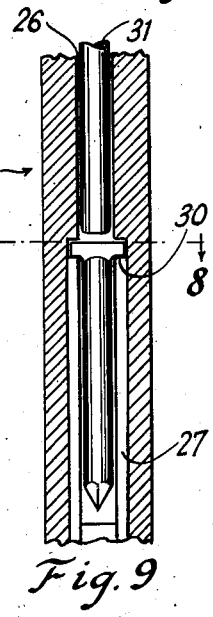 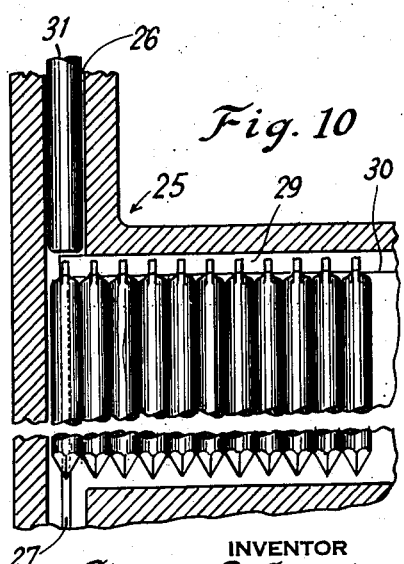
Fig. 8  Fig. 9  Fig. 10
INVENTOR
Charles B. Goodstein
BY
J.B. Felshin
ATTORNEY Patented May 3, 1949

2,468,821

UNITED STATES PATENT OFFICE 2,468,821

BRAD

Charles B. Goodstein, Newton Highlands, Mass.

Application February 24, 1945, Serial No. 579,620

2 Claims. (Cl. 85—28)

This invention relates to brads and driving machines therefor. It is particularly directed to a strip of brads coagulated or cemented together for use in a machine similar to a stapler to permit the brads to be successively driven.

An object of this invention is to provide a strip of improved brads cemented or coagulated together for use in a machine having a driver to successively drive the brads, each brad being provided with ears for holding two pieces of wood together when driven into the wood. By forming the brad with ears in place of a head, the brad can be supported over its entirety, while driven into the work, in a machine having a cylindrical passage for the brad, said cylindrical passage being formed with longitudinal slots through which the ears pass as the brad is driven.

Another object of this invention is to provide a brad of the character described which is minus a head but in its place is provided with ears. The ears are pressed out of the wire either at opposite sides of the brad or the entire top of the brad may be flattened to provide ears. If desired, the brad may be formed with one ear on one side only.

Yet another object of this invention is to provide a brad having a head and a driving device therefor having means to support the shank of the brad throughout its length when the brad is being driven.

Yet another object of this invention is to provide a strong and durable brad strip of the character described which shall be inexpensive to manufacture, easy to use in a stapling or nailing machine, and which shall be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of a brad embodying the invention;

Fig. 2 is a top plan view thereof;

Fig. 3 is a view similar to Fig. 1 but illustrating a modified construction;

Fig. 4 is a top plan view of the brad shown in Fig. 3;

Fig. 5 is a view similar to Fig. 1 and illustrating still another modification;

Fig. 6 is a top plan view of the brad shown in Fig. 5;

Fig. 7 is a top plan view of a brad strip embodying the invention;

Fig. 8 is a horizontal cross-sectional view through part of a nailing machine employing a brad strip embodying the invention;

Fig. 9 is a cross-sectional view taken on line 9—9 of Fig. 8;

Fig. 10 is a cross-sectional view taken on line 10—10 of Fig. 8;

Fig. 11 is a view similar to Fig. 1 and illustrating another modification; and

Fig. 12 is a top plan view of the brad shown in Fig. 11.

Referring now in detail to the drawing, 10 designates a brad embodying the invention. The same comprises a shank 12 formed with a point 13 at its lower end. The shank may be cylindrical in shape or of any other suitable shape. Adjacent the upper end of the shank 12 are a pair of protruding ears 14. The ears are flattened and integrally formed with the wire and are disposed in a plane passing through the axis of the brad. The ears 14 may be substantially circular and are disposed just below the upper end of the brad. The ears 14 may be formed by stamping or swedging the wire of which the brad is made. The ears project beyond the outer surface of the shank at two places but not all around so that the shank can be supported longitudinally in a passage of a driving machine as will be seen hereinafter.

Another form of brad is shown in Figs. 3 and 4. The brad 10a shown in said figures likewise has a shank 12a with a point 13a at the bottom. At its upper end the brad 10a is formed with ears 14a extending to the upper end of a shank. The ears are spaced from one another and are generally of triangular shape, having upwardly and outwardly inclined underedges.

In Fig. 5 the brad 10b embodying the invention is flattened at its upper end entirely across to form a pair of ears 14b. The entire upper end 16 of the brad is flattened as shown in Figs. 5 and 6 of the drawing.

In Fig. 7 there is shown a brad strip 20 embodying the invention. The brad strip 20 comprises a plurality of brads coagulated or cemented together by an adhesive between the adjacent brads as at 21. It will be noted that the ears of each of the brads are parallel to the ears of the other brads. Although strip 20, as illustrated, comprises the brads 10b, it will be understood that the strip may comprise brads 10 or 10a.

The brad strip 20 may be used in a nailing machine 25. In the nailing machine 25 there is provided a passage 26 to receive the leading brad of the strip. Communicating with the cylindrical passage 26 are opposed longitudinal slots 27. The machine 25 is furthermore formed with a passage 28 communicating with passage 26 and extending at right angles thereto and adapted to receive the brad strip 20. At the upper end of passage 28 is an enlarged portion 29 to receive the ears on the brads and forming shoulders 30 to engage the under edges of said ears. Passage 26 extends above and below passage 28. In the upper end of passage 26 is a plunger 31 for driving the leading nail or brad. It will be noted that the ears 14b will be received within the slots 27. The slots 27 terminate at the upper level of passage 29. Thus the ears move from passage 29 into alignment with the slots 27 and may thus move down in slots 27 while the body or shank of the brad is supported throughout its length in the cylindrical passage 26. Any suitable driving means may be used to drive the plunger 31; and a suitable spring may push the brad strip forwardly in passage 28.

It will now be understood that the round brad is provided with two swedged ears protruding outwardly to form the head instead of the usual flat circular head. This arrangement permits the brads to be coagulated into a strip whereby the brads may be driven into work by use of a nailing machine having means to support the wire or brad over its entire length. If the brad had a flat circular head of larger diameter than the shank, then the driving channel would have to be of a diameter large enough to permit the brad head to go through. The play would then permit buckling of the brad. Such play is eliminated by use of brads having flat ears in a vertical plane described above. The purpose of the ears is to provide some means for holding two pieces of wood together when driven.

A dominant feature of the invention is the provision of a brad or nail that has an ear or ears or a head which protrudes beyond the outer surface of the shank at less than the entire perimeter or circumference of the shank so that the brad can be supported for sliding movement in a passage having a surface contacting the shank throughout its length and hence prevent looseness, play and consequent buckling.

In Figs. 11 and 12 there is shown a brad 10c embodying the invention. This brad is similar to brad 10b except that it is provided with a single ear 14c. The ear 14c is swedged or flattened from the wire stock.

It will be apparent from a consideration of Figs. 2, 4, 6, 12 that in each case, the thickness of projections 14, 14a, 14b, 14c, is less than half the diameter of the respective shanks and that portion of the periphery of the shank from which the ears project, comprises less than half the total periphery of the shanks.

It will thus be seen that there is provided a device in which the several objects of this invention are achieved, and which is well adapted to meet the conditions of practical use.

In my brad construction I provide a brad of straight cylindrical contour of uniform transverse dimensions throughout its full length except that the outer or upper end of the brad is provided with projections extending diametrically from the outer end of said shank and said projections being preferably of a thickness less than one half the diameter of the shank. Each of the projections are rectangular in cross section both transversely and longitudinally. The inner or lower end of the brad may be provided with a suitably pointed portion. My brad is uninterrupted by recesses or projections on its upper or outer end and its opposite end.

This particular construction provides a maximum of guiding surfaces on my brad for use in my particular brad driving machine disclosed in this application. Because of the extensive guiding surfaces the tendency to bending or buckling of my brad is reduced to a minimum when driven by my improved driving apparatus or machine.

My driving machine 25 comprises a body having an upright guiding channel 26 for a driving plunger 31. The body 25 is also provided with a laterally disposed magazine or receptacle to receive a tier or packet of my improved brads secured together by a suitable adhesive as shown in Fig. 7. The brad projections 14b are arranged in parallel relation transversely of the brad packet. The magazine is in communication with the upright channel and is parallel thereto at one end thereof. The magazine is provided in its upper end with opposed parallel longitudinal guide ways 28, 29, 30 to receive the projections 9b of the brads for guiding the brads successively to driving position in the upright channel 26. The upright channel is provided with opposed grooves 27 in communication with the opposed guide ways 28, 29, 30. The opposed grooves 27 receive and guide the projections 14b as the brad is driven into the material. The upright channel portion below the magazine (not fully shown) constitutes a complete cylindrical guide being interrupted only by the diametrically opposed grooves 27. This lower guide portion embraces the major portion of the cylindrical brad so closely that bending or buckling of the brad is prevented as it is being driven into the material. The grooves 27 cooperating with the brad projections prevent the brad from rotating while it is being driven.

As various possible embodiments might be made of the above invention, and as various changes might be made in the embodiment above set forth, it is to be understood that all matter herein set forth or shown in the accompanying drawing is to be interpreted as illustrative and not in a limiting sense.

Since the brad is supported during the driving operation, a lighter gauge wire could be used eliminating splitting of the wood. Also treated woods of high density, urea or phenolic resins, compressed and tempered Masonite, plastics, aluminum, steel, copper, brass and all kinds of combinations of materials can be penetrated and held by a brad of the character described. It would be impossible to drive such a brad through hard material unless the brad is supported throughout its length as it is driven into the work.

Having thus described my invention, I claim as new and desire to secure by Letters Patent:

1. A brad having a straight cylindrical shank uninterrupted by recesses, said shank having projections thereon only at one end thereof, said projections extending diametrically from said shank and being of a thickness less than one half the diameter of said shank, the outer end of each of said projections being rectangular in both transverse and longitudinal cross section.

2. A brad having a straight cylindrical shank uninterrupted by recesses throughout its full length, said shank having projections thereon only at one end thereof, said projections extending diametrically from said shank and being of a thickness less than the radius of said shank, the outer end of each of said projections being rectangular in cross section and having a guiding and supporting shoulder thereon constituting the lower edge of each projection.

CHARLES B. GOODSTEIN.

REFERENCES CITED

The following references are of record in the file of this patent:

UNITED STATES PATENTS

| Number | Name | Date |
|---|---|---|
| 41,584 | Thayer | Feb. 9, 1864 |
| 72,856 | Humphrey | Dec. 31, 1867 |
| 391,109 | Bellanger | Oct. 16, 1888 |
| 451,213 | Shepley | Apr. 28, 1891 |
| 482,540 | Brown | Sept. 13, 1892 |
| 808,968 | Boda | Jan. 2, 1906 |
| 1,033,241 | Graham | July 23, 1912 |
| 1,592,495 | Lorenz | July 13, 1926 |
| 1,977,946 | Kammer | Oct. 23, 1936 |
| 2,294,463 | Krantz | Sept. 1, 1942 |
| 2,300,277 | Hansen | Oct. 27, 1942 |
| 2,314,481 | Crooks | Mar. 23, 1943 |

FOREIGN PATENTS

| Number | Country | Date |
|---|---|---|
| 72,177 | Germany | Jan. 28, 1893 |
| 1,894 | Great Britain | 1910 |
| 445,581 | France | Nov. 14, 1912 |
| 544,189 | Germany | Feb. 15, 1932 |
| 641,073 | Germany | Jan. 19, 1937 |
| 320,051 | Great Britain | Sept. 30, 1929 |